United States Patent [19]
Shands

[11] Patent Number: 4,740,804
[45] Date of Patent: Apr. 26, 1988

[54] MULTI-ADJUSTABLE BASE ATTACHMENT FOR FLASH UNITS

[76] Inventor: Timothy Shands, 400 Townes St., Greenville, S.C. 29601

[21] Appl. No.: 45,362

[22] Filed: May 1, 1987

[51] Int. Cl.$^4$ .............................................. G03B 15/02
[52] U.S. Cl. .................................... 354/126; 354/293; 248/181
[58] Field of Search .................. 354/126, 145.1, 149.1, 354/293; 362/3–18; 248/181

[56] References Cited

U.S. PATENT DOCUMENTS

| | | | |
|---|---|---|---|
| 2,670,228 | 2/1954 | Pagliuso | 248/181 X |
| 3,893,145 | 7/1975 | King | 354/293 |
| 4,201,434 | 5/1980 | Tureck | 354/145.1 X |

FOREIGN PATENT DOCUMENTS 283665  3/1931  Italy ..................................... 248/181

*Primary Examiner*—L. T. Hix
*Assistant Examiner*—Brian W. Brown
*Attorney, Agent, or Firm*—Dority & Manning

[57] ABSTRACT

An apparatus is interposed between a typical camera hot shoe mount and a flash unit to permit multi-position adjustment of the flash relative the camera, without requiring modification to either of same. A base unit defines a generally spherical cavity in which a mated ball is movable. Front-to-back and sideways movements of the ball within the cavity are continuous, but limited in range by a hot shoe element attached to the top of the ball for support of the flash unit. Rotational movement of the ball within the cavity is also continuous, but limited as is its other motion to prevent damage to electrical wires which may optionally run through the attachment device for electrically interconnecting the camera and flash unit. A retaining cap is received about the base unit and may be threadably tightened thereto for retaining the ball in a desired position within the spherical cavity. The apparatus may include a flash foot on its respective bottom for mounting it and a flash unit it supports on a camera hot shoe.

13 Claims, 2 Drawing Sheets

MULTI-ADJUSTABLE BASE ATTACHMENT FOR FLASH UNITS

BACKGROUND OF THE INVENTION

This invention in general concerns a camera attachment for supporting a flash unit, and in particular is directed to such an attachment for providing multiple-position adjustment of the flash unit relative the camera to obtain special flash effects, without requiring modification to either the camera or flash unit.

Heretofore, photographers have sought to make sophisticated use of artificial light for enhancement of naturally-existing light (i.e. ambient light) or to produce some particular special effects for shading, contrast, or the like. Professional photographers in a studio have an advantage over photographers "in the field" since the studio photographers may permanently mount additional lights on movable tripods, separate from their tripod-supported or hand-held camera. Such separate mounting of the lighting or flash unit from the camera, including potential use of plural, separate lights, provides the studio photographer with maximum flexibility. However, such advantages are usually as a practical matter limited to the controlled studio setting.

Photographers in the field who wish to obtain similar flexibility with their lighting and/or flash unit accessories often separate their flash units from a fixed mount relative the camera and hold the flash unit in one hand while holding the camera in the other hand, so as to gain advantageous positions for both units relative their subject. The obvious inconvenience and reduced efficiency of separating the flash unit from the camera is to some extent necessitated by the typical fixed mount of the flash unit on the camera. In other words, many conventional flash units are typically received in a hot shoe mount or a bayonet mount supported by the body of the camera, which provides fixed support for the flash unit relative the camera, and possibly electrical connection for conveying a flash signal from the camera to the flash unit. Alternatively, the fixed mount may provide support only for the flash unit, with a separate electrical connection (such as external electrical wire) being made between the camera and flash unit, or between the flash unit and a battery pack therefor which is carried by the photographer and triggered by a control line from the camera.

In addition to such fixed mount supports and manual support of flash units, camera-mounted flash units are known which incorporate a pivoting base which attaches to the camera, thereby permitting adjustment of the flash unit relative the camera about a single axis of movement (such as tilting the flash back from the subject so as to bounce light off a ceiling). However, the relatively limited adjustability of such units does not favorably compare with the flexibility of studio configurations, or even manually supporting a flash unit in the field.

SUMMARY OF THE INVENTION

The present invention recognizes and addresses such drawbacks and other disadvantages associated with camera-supported flash units.

Accordingly, it is one general object of the present invention to provide improved multi-adjustable support for a flash unit, whether used with a camera in the field or in a studio. More particularly, it is an object of this invention to provide an attachment which may be interposed between a conventional camera and a conventional flash unit for permitting multi-position adjustment of such flash unit without requiring modification to either the camera or flash unit.

It is another object of the present invention to provide a mounting attachment which may be supported directly on a camera, such as on a hot shoe receptacle thereof, and which in turn may receive and support a conventional flash unit thereon, with such attachment providing adjustable support for the flash unit relative the camera. It is a further object of this invention to provide such an adjustable mounting attachment which may be selectively locked into a desired position to hold the flash unit in a specific orientation relative the camera, such as for obtaining special flash effects therewith.

It is still another object of the present invention to provide an adjustable mounting attachment which is continuously adjustable in at least two separate perpendicular axes of movement, extending at least within a defined limited region. It is also an object to provide such an adjustable mounting attachment which also rotatably supports a flash unit relative the camera, in addition to the continuous freedom of movement relative two separate perpendicular axes.

Furthermore, it is a present object to provide a multi-position adjustable attachment which not only adjustably supports a flash unit relative a camera, but which optionally also provides for automatic electrical connection therebetween. It is another object to provide protection for such electrical connections, when same are present in a given embodiment of this invention.

It is another more general object of this invention to provide such a multi-adjustable attachment for flash units which is generally universal, is user-friendly with respect to both making adjustments and locking such adjustments in place, and which is not cumbersome or impractical so as to interfere with the photographer's concentration.

These and other objects of the present invention are variously achieved with practice of features and elements of the invention as disclosed herewith, different combinations of which features and elements may comprise alternative embodiments of a mounting apparatus in accordance with the present invention.

One such multi-position adjustable device for mounting a flash unit on a camera, in accordance with the present invention, comprises: first mounting means for supporting such device on a given camera; second mounting means for supporting a given flash unit on such device; adjustment means situated between the first and second mounting means for positioning the mounting means in any desired mutual relationship with respect to two separate, perpendicular axes of movement, limited within a predetermined range; and locking means for selectively holding such first and second mounting means in a desired relationship established therebetween with such adjustment means; whereby a flash unit supported on such device may be selectively positioned and held about two separate axes of movement relative a camera on which such device is supported.

Another embodiment in accordance with the present invention of a multi-positioned adjustable device for mounting a flash unit on a camera, comprises: a main support frame having a generally flat base portion joined with a generally cylindrical body defining a cavity therein and further defining an opening in the upper periphery of such body, which opening is in communication with such cavity; a ball element substantially received in and slightly smaller than such cavity, part of the ball element protruding from such cylindrical body through such opening thereof, the ball element being generally continuously movable in such cavity within predetermined ranges; flash foot means, supported on the frame base portion, and adapted for mounting such device on a shoe receptacle of a given camera; device shoe means, supported on the part of the ball element protruding from such cylindrical body opening, and adapted for mounting a flash foot member of a given flash unit on such device; and a retaining member selectively positioned about such cylindrical body of the support frame for substantially securing the position of the ball element relative such cavity receiving same; whereby the position of a given flash unit mounted on such device may be selected and secured relative a given camera on which such device is mounted.

Still another camera attachment in accordance with the present invention for adjustably mounting a flash unit on a given camera so as to achieve special effects therewith, comprises: a central structure including an annular base received on one end of a generally cylindrical body, such body defining exterior threads thereabout and interior walls forming a partially spherical cavity within such body; an attachment electrically-wired flash foot attached to such annular base, and adapted for operatively and supportingly mounting such attachment on a camera hot shoe receptacle of a given camera; a generally spherical element with diametrically opposed flattened areas, such spherical element partly residing and retained in such cylindrical body interior cavity and partly extending from such body so that one of the flattened areas resides outside of such body while the other of the flattened areas generally opposes the annular base of such central structure, such spherical element having a diameter slightly smaller than that of the body interior cavity to permit movement therein; an attachment electrically-wired hot shoe receptacle, supported on the one flattened area of such spherical element which projects from the body, and adapted for operatively and supportingly mounting a flash foot of a given flash unit thereon; electrical connection means for electrically connecting such attachment flash foot with the attachment hot shoe receptacle, so that a flash signal generated at the camera hot shoe receptacle of a camera on which such attachment is mounted will be propagated to a flash unit mounted o such attachment; and a retaining ring having interior threads, such ring being selectively disposed about the cylindrical body and threadably tightened onto the exterior threads thereof adequate to compress such body such that the cylindrical body walls forming such spherical cavity thereof grip the spherical element therein to prevent movement of such spherical element otherwise permitted whenever the body walls are not compressed; whereby a standard flash unit may be mounted and selectively positioned on a standard camera in a desired relationship thereto so as to produce special flash effects, without requiring modification to such flash unit or to such camera.

Various modifications to and equivalent substitutions of different elements and features of the present invention will be apparent to those of ordinary skill in the art, and all such variations are intended to come within the spirit and scope of this invention by virtue of present reference thereto.

BRIEF DESCRIPTION OF THE DRAWINGS

A complete and enabling description of the present invention, including the best mode thereof, is set forth in the present specification, in conjunction with the appended drawings, in which.

Figure 1:
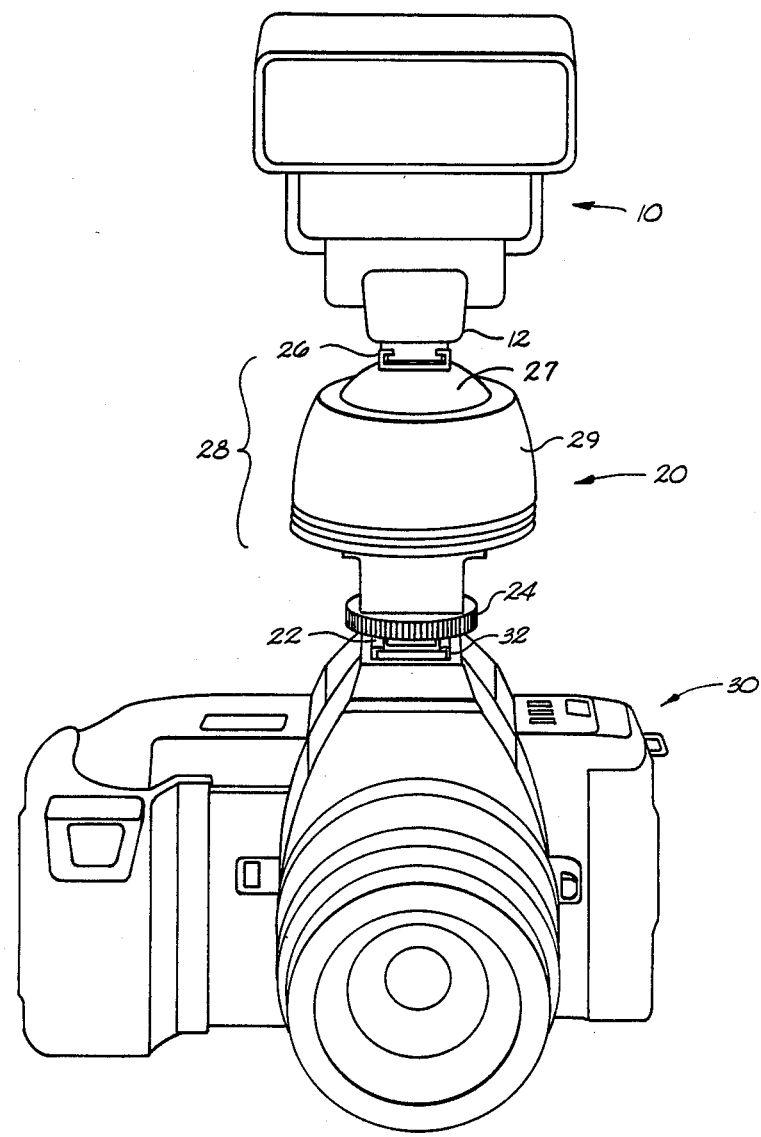
FIG. 1 illustrates a mounting attachment in accordance with the present invention, interposed in its preferred use configuration between a typical flash unit and camera.

Repeat use of reference characters throughout the following specification and accompanying drawings is intended to represent same or analogous features or elements of the invention.

DETAILED DESCRIPTION OF THE PREFERRED EMBODIMENTS

FIG. 1 illustrates a perspective view of a preferred use configuration for the present invention, wherein a conventional flash unit 10 is supported on an adjustable mounting device 20 in accordance with the present invention, which mounting device is in turn supported on a conventional camera 30. Such camera is typically outfitted with a hot shoe receptacle 32, which is a female-type connector which normally provides physical support for a flash unit and electrical connection therewith so that a flash signal may be transmitted from the camera to the flash unit. A flash foot, such as foot 12 of flash unit 10 may ordinarily be received in hot shoe 32, for support and operation, as discussed.

With the present invention, attachment 20 is provided with its own flash foot 22 or equivalent structure, including a tightening element 24, for being received and supported directly on hot shoe 32. While FIG. 1 illustrates one preferred embodiment of the present invention, other mounting means for supporting an attachment device in accordance with this invention on a given camera may be adapted to mate with specific support structures existing on a given camera. For example, flash foot 22 may be replaced with a bayonet-type mount whenever a corresponding mount is present on camera 30.

A second mounting means in this exemplary embodiment comprises an attachment hot shoe 26 for supporting a given flash unit 10 on the attachment device itself. Typically, such hot shoe 26 may be substantially similar to the camera hot shoe 32 in that it may provide both physical support for flash unit 10 and electrical interconnection therewith. Electrical wiring optionally included within attachment device 20, as further discussed below, may interconnect flash foot 22 thereof with its hot shoe 26 so that a flash signal emitted by camera 30 may be propagated through attachment device 20 for being received by and controlling flash unit 10.

In general, the two respective mounting means of attachment device 20 are both in turn supported on and interconnected by adjustment and locking means 28, the details of which are discussed below with reference to FIGS. 2 and 3. Briefly, a generally spherical ball member 27 supports the second mounting means, i.e. hot shoe 26 in this embodiment, and permits adjustment thereof in at least two separate, perpendicular axes of movement. Such movement is limited to a predetermined range by engagement of hot shoe 26 with an upper peripheral edge of retaining ring 29, which forms a portion of a locking means for selectively holding spherical member 27 in a desired orientation so that flash unit 10 mounted thereon is desirably positioned relative camera 30. Limitation to such movement also protects electrical wiring embedded within attachment 20, whenever such wiring is used.

The details of both such adjustment means and such locking means are discussed with reference to FIGS. 2 and 3; however, FIG. 1 illustrates some of the practical advantages resulting from such adjustment means and locking means. In FIG. 1, flash unit 10 is illustrated as positioned in a generally vertical orientation relative hot shoe 32 of camera 30. However, as appreciated by those of ordinary skill in the art, locking means 29 may be released and ball member 27 continuously re-positioned so that flash unit 10 is desirably positioned in front to back and lateral relationship to camera 30, and further rotatably positioned about the vertical axis of flash unit 10. Once a desired position is achieved, even one in which the lamp unit 10 is turned 180° away from the front of camera 30, and directed generally downward, locking means 29 may be re-engaged to fix such relative position between lamp unit 10 and camera 30. Flash unit 10 and camera 30 may comprise unmodified conventional devices, and hence need not be described further in detail. However, the structure and operation of attachment device 20 are discussed in detail below.

Figures 2, 3:
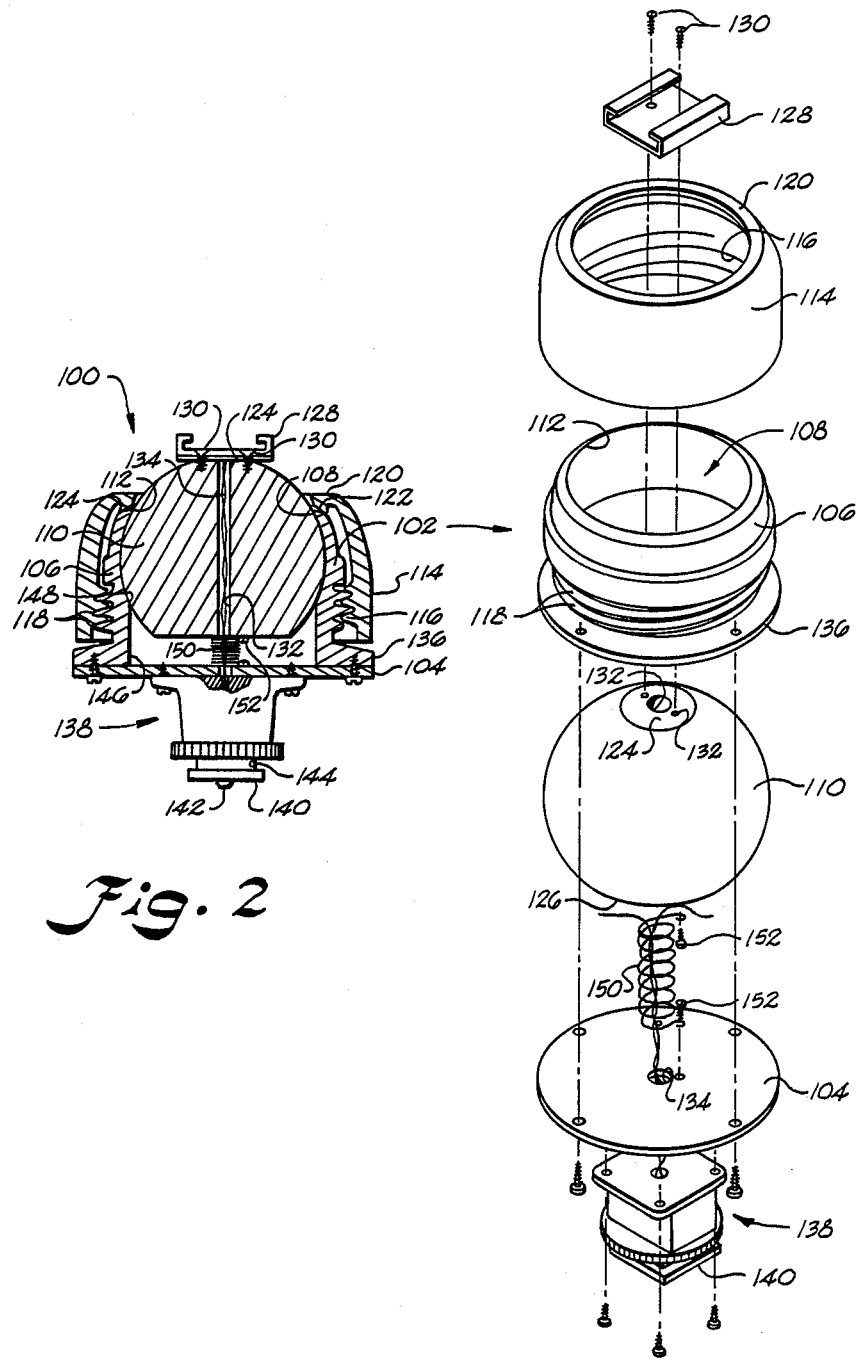
FIGS. 2 and 3 illustrate a side cross-sectional view and exploded perspective view, respectively, of an exemplary mounting attachment in accordance with the present invention.

Now with reference to FIGS. 2 and 3, a sectional side view and exploded perspective view of an exemplary mounting device similar to attachment 20 of FIG. 1 is discussed in detail. For clarity, like reference characters are used in both such figures to refer to same or analogous elements.

An exemplary camera attachment 100 is formed with a central structure or main support frame 102 which includes a generally flat base portion or annular element 104 which is integrally associated with or attached to a generally cylindrical body 106. Walls of body 106 define an interior generally spherical cavity 108 within which a generally spherical ball member 110 partly resides. Ball member 110 has a slightly smaller diameter than cavity 108 so as to be continuously freely movable therein, in the manner described above with reference to FIG. 1.

As illustrated by present FIGS. 1 and 2, a portion of ball member 110 protrudes from main support frame 102 through an upper peripheral opening 112 thereof. As discussed below, such upper peripheral area of main support frame 102 may be selectively inwardly compressed so as to grasp spherical ball member 110 and secure same in a selected orientation thereof relative cavity 108. For such purpose, a retaining ring (or cap) 114 may be selectively secured about the cylindrical body of main support frame 102, and provided with interior threads 116 which matably engage with threads 118 formed on the exterior of cylindrical body 106.

Locking means or retaining cap 114 includes an annular lip 120 of relatively reduced diameter. As locking means 114 is progressively threadably engaged with main support frame 102, such reduced diameter annular lip 120 is urged downward into contact with the relatively flexible upper peripheral region of main support body 102, described above. An annular contact lip 122 of ring 114 comes into literal engagement with an opposing annular contact lip 124 on the upper periphery of cylindrical body 106 so that progressive threadable engagement of retaining ring 114 causes the upper peripheral portion of cylindrical body 106 to be compressed and thereby grasp annular ball member 110 received in cavity 108 thereof. Thus, a locking means is defined for controllably fixing the selected position of spherical ball member 110 relative its respective cavity 108.

Ball member 110 further defines diametrically opposed flattened areas 124 and 126. An attachment hot shoe receptacle 128 is preferably secured to flattened area 124, such as with a pair of screws 130 seated in screw holes 132 formed in flattened area 124. Of course, equivalent securement elements or methods may be practiced.

As understood by those of ordinary skill in the art upon perceiving present FIGS. 1 and 2, ball member 110 is freely movable in back-to-front and side-to-side (i.e. lateral) movements, within a defined range limited by engagement of attachment hot shoe member 128 with the upper annular lip 120 of retaining cap 114. Such movement limitation protects electrical wires received within attachment 100 from overtwisting, as described below.

Ball member 110 also includes a central channel 132 defined axially therein for interconnecting the diametrically opposed flattened areas thereof, and for receiving electrical wires 134 therethrough. One end of such wires electrically connect with attachment hot shoe 128, while the other end thereof pass through a central opening 134 of annular element 136 secured to a base portion 104 of member 102 so as to electrically interconnect with an electrically-wired attachment flash foot 138. As understood by those of ordinary skill in the art, such flash foot is of fairly conventional construction, and typically includes a planar member 140 for being slidably received in a conventional hot shoe receptacle, and contact elements 142 and 144 for making electrical connections.

When assembled, ball member 110 may be received within central cavity 108 by passing same through the cylindrical channel 146 of main support frame 102, just pass the lower edge 148 of its central cavity 108. Alternatively, the lower spherical area of such cavity may be somewhat merged with the cylindrical area 146 so as to permit greater freedom in the introduction of spherical ball element 110 therein, with such element 110 being held upwardly in cavity 108 by a spring 150. Spring 150 is normally compressed between flattened area 126 of ball member 110 and an upper side of annular element 136. Spring 150 may also be fixedly secured with screw elements 152 or the like at each end thereof to the just described respective contact surfaces therefor. When so fixedly received, spring 150 comprises a movement limiting member which prevents excessive rotation of ball member 110 relative its respective cavity 108, thereby protecting electrical wires 134 from overtwisting.

While various attachment elements and methods may be practiced, miniaturized screws and preformed holes therefor are one preferred method of assembling the exploded elements of FIG. 3 into the useful configuration of present FIG. 2, as illustrated throughout such figures. For example, four screws may be used to secure a first mounting means (i.e. flash foot 138) for supporting attachment device 100 on a given camera to annular element 136. Annular element 136 may in turn be secured by four screws to the base portion 104 of main support frame 102. Likewise, a second mounting means (i.e. the attachment hot shoe 128) for supporting a given flash unit on the attachment device 100 may be removably secured to ball member 110 with screws 130, as described above.

While a particular exemplary embodiment in accordance with features of the presently disclosed invention has been described in detail, together with preferred uses of such device, various modifications and variations thereto may be practiced by those of ordinary skill in the art without departing from the spirit and scope of this invention. For example, different types of respective mounting means for supporting the attachment device to a given camera, or for in turn supporting a given flash unit on the attachment device, may be used in place of the hot shoe type support features illustrated herein. Alternatively, even if such hot shoe members are used, a separate electrical interconnection between the flash unit and the camera may be used in place of the electrical wiring disclosed herein. In other words, such wiring and the openings required therefor may be omitted in favor of such external electrical connections. While specific description has been set forth above, all such words are words of description and example only, and not words of limitation, which appear only in the following appended claims.

What is claimed is:

1. A multi-position adjustable device for mounting a flash unit on a camera, said device comprising:

first hot shoe mounting means, provided on a lower side of said device, for supporting same on a given camera;

second hot shoe mounting means, provided on an upper side of said device, for supporting a given flash unit on said device;

ball and socket adjustment means situated between said first and second mounting means for positioning said mounting means in any desired mutual relationship with respect to two separate, perpendicular axes of movement, limited within a predetermined range, said adjustment means including a ball member with said second mounting means secured on an upper side thereof, and defining a passageway therethrough with electrical wiring therein connecting with said second mounting means and passing to a lower surface of said ball member opposite said upper surface thereof, and said adjustment means further including a socket member having a lower base portion receiving said first mounting means generally beneath said ball member lower surface, said electrical wiring being connected to said first mounting means and said socket member having a capturing portion generally engaging about the circumference of the central portion of said ball member axially between said upper and lower sides thereof so that such sides remain substantially unobstructed during relative movement of said ball and socket members within said limited predetermined range; and locking means, disposed circumferentially about said socket member capturing portion and said ball member central portion, for selectively holding said first and second mounting means in a desired relationship established therebetween with said adjustment means, by selectively providing inward force about an outer diameter portion of said socket member capturing portion;

whereby a flash unit supported on said device may be selectively positioned and held about two separate axes of movement relative a camera on which said device is supported.

2. A device as in claim 1, wherein:
   said first hot shoe mounting means comprises a flash foot for being received into a hot shoe element of a given camera; and
   said second hot shoe mounting means comprises a hot shoe element for receiving a flash foot of a given flash unit.

3. A device as in claim 2, wherein said electrical wiring received within said device interconnects said flash foot and said hot shoe element thereof, whereby a flash signal emitted by a hot shoe element of a given camera on which said device is supported may be propagated through said device to the flash foot of a given flash unit supported on said device, so that the given camera may automatically initiate flashing of the given flash unit as if the flash foot of such flash unit were mounted directly onto the hot shoe element of such given camera.

4. A device as in claim 1, wherein said adjustment means further includes means for rotatably positioning said first and second mounting means with a desired rotational displacement therebetween.

5. A device as in claim 1, wherein:
   said locking means includes a retaining cap selectively situated about said adjustment means for selectively fixing the position of said ball member relative said socket member.

6. A device as in claim 5, further comprising matable respective screw threads formed on the exterior of said adjustment means socket member and the interior of said locking means retaining cap, wherein said retaining cap further includes an annular lip of reduced diameter which is urged against the exterior of said socket member as such socket member and retaining cap are progressively threadably mated, which urging results in compression of said socket member adequate to frictionally engage and fix the position of said ball member therein.

7. A device as in claim 1, wherein:
   cooperation of said ball member and its respective socket member permits relative rotational adjustment of said first and second mounting means; and
   said socket member lower base portion includes an annular element received on said lower surface thereof for supporting said first mounting means thereon, said annular member including a central opening provided for passage of electrical wiring between said first and second mounting means.

8. A device as in claim 7, further including:
   a limiting spring attached between said annular element of said socket member and the bottom of said ball member for preventing excessive rotation of said ball member relative its respective socket member, so as to prevent harmful over-twisting of said electrical wiring; and wherein
   said second mounting means includes a hot shoe element received on said upper exposed surface of said ball member, and adapted for receipt of a flash foot element of a given flash unit, said hot shoe element limiting movement of said adjustment means in said two separate, perpendicular axes of movement so as to define limits of said predetermined range of such movement.

9. A multi-position adjustable device for mounting a flash unit on a camera, said device comprising:
- a main support frame having a generally flat base portion joined with a generally cylindrical body defining a cavity therein and further defining an opening in the upper periphery of said body, which opening is in communication with said cavity;
- a ball element substantially received in and slightly smaller than said cavity, part of said ball element protruding from said cylindrical body through said opening thereof, said ball element being generally continuously movable in said cavity within predetermined ranges;
- flash foot means, supported on said frame base portion, and adapted for mounting said device on a shoe receptacle of a given camera;
- device shoe means, supported on the part of said ball element protruding from said cylindrical body opening, and adapted for mounting a flash foot member of a given flash unit on said device; and
- a retaining member selectively positioned about said cylindrical body of said support frame for substantially securing the position of said ball element relative said cavity receiving same;
- whereby the position of a given flash unit mounted on said device may be selected and secured relative a given camera on which said device is mounted; wherein
- said device shoe means and said flash foot means have electrical contacts for electrically connecting with a flash unit and camera, respectively;
- said device further includes electrical wiring interconnecting such contacts of said flash foot means and device shoe means for transmitting flash signals therebetween, whereby a flash signal from a camera on which said device is mounted may be used to automatically control a flash unit which is mounted on said device;
- said support frame flat base and said ball element each have central channels therethrough for the receipt of said electrical wiring to interconnect said flash foot means and said device shoe means; and wherein
- said device further includes a spring with the respective ends thereof fixedly received between said flat base portion and an adjacent portion of said ball element, such fixed receipt of said spring preventing excessive rotation of said ball element within said body cavity, whereby said electrical wiring passing through said ball element and said flat base portion is protected from breakage due to overtwisting thereof.

10. A device as in claim 9, further comprising:
- respective matable threads on the exterior of said cylindrical body and the interior of said retaining member, which threads cooperate for the selective securement of such retaining member about said cylindrical body; and
- respective annular lips on said retaining member and cylindrical body, adjacent said cylindrical body opening, said respective annular lips opposing one another for contact whereby the upper periphery of said cylindrical body is selectively compressed by securement of said retaining member for grasping said ball element received within said cavity therefor.

11. A device as in claim 9, wherein:
- said part of said ball element protruding from said cylindrical body defines a relatively flat region for support of said device shoe means thereon; and
- said adjacent portion of said ball element to which said spring is attached defines another flattened area, generally diametrically opposed to said flat region of said ball element.

12. A camera attachment for adjustably mounting a flash unit on a given camera so as to achieve special flash effects therewith, said attachment comprising:
- a central structure including an annular base received on one end of a generally cylindrical body, said body defining exterior threads thereabout and interior walls forming a partially spherical cavity within said body;
- an attachment electrically-wired flash foot attached to said annular base, and adapted for operatively and supportingly mounting said attachment on a camera hot shoe receptacle of a given camera;
- a generally spherical element with diametrically opposed flattened areas, said spherical element partly residing and retained in said cylindrical body interior cavity and partly extending from said body so that one of said flattened areas resides outside of said body while the other of said flattened areas generally opposes said annular base of said central structure, said spherical element having a diameter slightly smaller than that of said body interior cavity to permit movement therein;
- an attachment electrically-wired hot shoe receptacle, supported on said one flattened area of said spherical element which projects from said body, and adapted for operatively and supportingly mounting a flash foot of a given flash unit thereon;
- electrical connection means for electrically connecting said attachment flash foot with said attachment hot shoe receptacle, so that a flash signal generated at the camera hot shoe receptacle of a camera on which said attachment is mounted will be propagated to a flash unit mounted on said attachment; and
- a retaining ring having interior threads, said ring being selectively disposed about said cylindrical body and threadably tightened onto said exterior threads thereof adequate to compress said body such that said cylindrical body walls forming said spherical cavity thereof grip said spherical element therein to prevent movement of said spherical element otherwise permitted whenever such body walls are not compressed;
- whereby a standard flash unit may be mounted and selectively positioned on a standard camera in a desired relationship thereto so as to produce special flash effects, without requiring modification to such flash unit or to such camera; and wherein
- said camera attachment further comprises retaining spring means, fixedly secured between said other flattened area of said spherical element and an upper side of said annular base, for preventing excessive rotation of said spherical element relative said body spherical cavity, thereby protecting said electrical connection means received within said attachment.

13. An attachment as in claim 12, wherein:
- said cylindrical body defines an annular upper peripheral edge thereof having a center opening through which said spherical element protrudes, said annular lip retaining said spherical element partly within said body spherical cavity; and wherein
- said retaining ring includes a mating annular lip for contacting said cylindrical body upper peripheral lip for compressing walls thereof for selected grasping of said spherical element.

* * * * *